US009631593B2

(12) United States Patent
Nakajima et al.

(10) Patent No.: US 9,631,593 B2
(45) Date of Patent: Apr. 25, 2017

(54) CONTROL DEVICE FOR INTERNAL COMBUSTION ENGINE (71) Applicant: TOYOTA JIDOSHA KABUSHIKI KAISHA, Toyota-shi (JP)

(72) Inventors: Yuta Nakajima, Toyota (JP); Tomohiro Nakano, Nagoya (JP); Eiji Murase, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 148 days.

(21) Appl. No.: 14/748,939

(22) Filed: Jun. 24, 2015

(65) Prior Publication Data
US 2015/0369158 A1 Dec. 24, 2015

(30) Foreign Application Priority Data
Jun. 24, 2014 (JP) .................................. 2014-129289

(51) Int. Cl.
*F02D 41/00* (2006.01)
*F02M 61/10* (2006.01)
*F02D 41/30* (2006.01)
*F02M 51/06* (2006.01)
*F02D 41/40* (2006.01)
*F02D 41/38* (2006.01)

(52) U.S. Cl.
CPC ......... *F02M 61/10* (2013.01); *F02D 41/3094* (2013.01); *F02D 41/402* (2013.01); *F02M 51/061* (2013.01); *F02D 2041/389* (2013.01); *F02D 2200/063* (2013.01); *Y02T 10/44* (2013.01)

(58) Field of Classification Search
CPC .............................. F02D 41/402; F02M 61/00
See application file for complete search history.

(56) References Cited

U.S. PATENT DOCUMENTS

| 6,032,642 A | 3/2000 | Trumbower et al. |
| 6,244,241 B1 | 6/2001 | Mamiya et al. |
| 6,748,920 B2 | 6/2004 | Ito et al. |
| 2006/0207565 A1 | 9/2006 | Nishimura |

(Continued)

FOREIGN PATENT DOCUMENTS

| DE | 103 26 914 A1 | 1/2005 |
| JP | 11-343911 | 12/1999 |

(Continued)

*Primary Examiner* — Thomas Moulis
(74) *Attorney, Agent, or Firm* — Oblon, McClelland, Maier & Neustadt, L.L.P.

(57) ABSTRACT

A control device for an internal combustion engine is provided. The internal combustion engine includes an in-cylinder injector. The control device includes an electronic control unit. The electronic control unit is configured to: control energizing time for the in-cylinder injector when a partial lift injection is performed such that the partial lift injection becomes maximum partial lift injection with a longest energizing time in the partial lift injection; and control the number of energizations for performing the maximum partial lift injection during a single injection stroke such that a total of injection amounts of the maximum partial lift injection by the number of the energizations is equal to or less than a required injection amount as a target amount for the injection amount of a single injection stroke.

6 Claims, 8 Drawing Sheets

(56) References Cited

U.S. PATENT DOCUMENTS

| | | | |
|---|---|---|---|
| 2010/0116243 A1 | 5/2010 | Koyama et al. | |
| 2015/0369161 A1 | 12/2015 | Nakano et al. | |
| 2016/0208730 A1* | 7/2016 | Uchida | F02D 41/401 |
| 2016/0215724 A1* | 7/2016 | Mitani | F02D 41/402 |
| 2016/0237935 A1* | 8/2016 | Tanaka | F02D 41/247 |
| 2016/0245211 A1* | 8/2016 | Katsurahara | F02D 41/20 |
| 2016/0281624 A1* | 9/2016 | Dames | F02D 41/40 |

FOREIGN PATENT DOCUMENTS

| | | |
|---|---|---|
| JP | 2003-343331 | 12/2003 |
| JP | 2013-104326 | 5/2013 |
| JP | 2013-245576 | 12/2013 |
| JP | 2016-8543 A | 1/2016 |

* cited by examiner

CONTROL DEVICE FOR INTERNAL COMBUSTION ENGINE

INCORPORATION BY REFERENCE

The disclosure of Japanese Patent Application No. 2014-129289 filed on Jun. 24, 2014 including the specification, drawings and abstract is incorporated herein by reference in its entirety.

BACKGROUND OF THE INVENTION

1. Field of the Invention

The invention relates to a control device for an internal combustion engine and, more particularly, to a device for controlling fuel injection into an internal combustion engine.

2. Description of Related Art

In order to improve exhaust properties, it is desirable to allow micro injection by decreasing the minimum injection amount per injection and realize a precise fuel injection control. Meanwhile, a fuel injection control device for an internal combustion engine that executes partial lift injection during which a needle valve does not reach a fully-open state is also known (for example, refer to Japanese Patent Application Publication No. 2013-104326).

The micro injection can be realized when the partial lift injection is used.

SUMMARY OF THE INVENTION

However, the period during which the needle valve is open is short and the injection amount is small in the case of the partial lift injection during which the energization is terminated before the needle valve reaches the fully-open state. Accordingly, a deviation in the valve-open period and the valve-opening speed largely affect the injection amount and the injection amount is likely to become irregular.

In a case where a plurality of the partial lift injections are executed in an injection stroke for the injection of the fuel used in combustion in a single combustion stroke, in particular, the irregularities of the injection amounts of the respective partial lift injections accumulate, and thus the injection amount irregularity with respect to a target amount becomes likely to be significant.

The invention provides a control device for an internal combustion engine that is capable of realizing precise fuel injection using partial lift injection.

According to an aspect of the invention, there is provided a control device for an internal combustion engine. The internal combustion engine includes an in-cylinder injector. The in-cylinder injector is configured to inject a fuel into a cylinder of the internal combustion engine.

The control device includes an electronic control unit. The electronic control unit is configured to: (i) control energizing time for the in-cylinder injector when a partial lift injection is performed such that the partial lift injection becomes maximum partial lift injection with a longest energizing time in the partial lift injection, the partial lift injection being a injection during which a needle valve of the in-cylinder injector does not reach a fully open state; and (ii) control the number of energizations for performing the maximum partial lift injection during a single injection stroke such that a total of injection amounts of the maximum partial lift injection by the number of the energizations is equal to or less than a required injection amount as a target amount for the injection amount of a single injection stroke.

In the partial lift injection, during which the energization is terminated before the needle valve reaches the fully-open state, a fuel injection amount irregularity tends to increase as the energizing time decreases. Accordingly, the injection amount irregularity decreases, even during the partial lift injection, as the energizing time increases. Accordingly, a high-accuracy micro injection can be realized with the injection amount irregularity inhibited to the minimum when maximum partial lift injection, in which the energizing time is the longest in the partial lift injection, is executed.

According to the control device of the aspect described above, the maximum partial lift injection is executed within a range of the number not exceeding the required injection amount in a single injection stroke. Even during the partial lift injection, the fuel injection control is performed by using the high-accuracy maximum partial lift injection. Accordingly, the precise fuel injection control can be realized.

In the control device according to the aspect described above, the electronic control unit may be configured to control the number of energizations for performing the maximum partial lift injection such that the number of energizations for performing the maximum partial lift injection increases as the required injection amount increases.

According to the control device of the aspect described above, the number of executions of the maximum partial lift injection increases as the required injection amount increases. Accordingly, the chance of execution of the high-accuracy maximum partial lift injection increases, and the precise fuel injection control can be realized.

In the control device according to the aspect described above, the electronic control unit may be configured to execute full lift injection during which the needle valve of the in-cylinder injector is fully opened in addition to the maximum partial lift injection. The electronic control unit may be configured to allow the fuel to be injected by the full lift injection from the in-cylinder injector by the amount equal to the amount short of the required injection amount with the maximum partial lift injection alone.

According to the control device of the aspect described above, the fuel is injected by the full lift injection, during which the needle valve is fully opened, by the amount equal to the shortfall as in the configuration described above in a case where the injection amount is short of the required injection amount with the maximum partial lift injection alone. Accordingly, the injection amount can be supplemented.

In the control device according to the aspect described above, the internal combustion engine may include a port injector configured to inject a fuel into an intake port. The electronic control unit may be configured to control the energization of the port injector in addition to the energization of the in-cylinder injector. The electronic control unit may be configured to allow the fuel to be injected from the port injector by the amount equal to the amount short of the required injection amount with the maximum partial lift injection alone.

According to the control device of the aspect described above, the port injector is provided in addition to the in-cylinder injector. In a case where the injection amount is short of the required injection amount with the maximum partial lift injection alone, the fuel is injected from the port injector by the amount equal to the shortfall so that the injection amount can be supplemented.

In the control device according to the aspect described above, the electronic control unit may be configured to control the number of energizations for performing the maximum partial lift injection such that the number of energizations for performing the maximum partial lift injection is a maximum number among the numbers of the energization at which the injection amount of the maximum partial lift injection is equal to or less than the required injection amount.

According to the control device of the aspect described above, the maximum partial lift injection is executed to the maximum extent possible within the range in which the injection amount of the maximum partial lift injection does not exceed the required injection amount. Accordingly, the fuel injection control can be performed, even during the partial lift injection, with the high-accuracy maximum partial lift injection utilized to the maximum extent possible.

In the control device according to the aspect described above, the electronic control unit may be configured to control the number of energizations for performing the maximum partial lift injection such that the number of energizations for performing the maximum partial lift injection is a maximum number within the number of energizations which is performed by the in-cylinder injector during a single injection stroke.

The period suitable for the fuel injection shortens as the rotation speed of the internal combustion engine increases. Accordingly, the number of the maximum partial lift injections that can be executed per injection stroke decreases. Accordingly, the set number of the maximum partial lift injections may not be completely executed during the period suitable for the fuel injection when the engine rotation speed is high.

According to the control device of the aspect described above, the maximum partial lift injection is executed to the maximum extent possible within the range of the number of the possible executions in a single injection stroke with the injection amount of the maximum partial lift injection not exceeding the required injection amount. Accordingly, the fuel injection control can be performed with the high-accuracy maximum partial lift injection utilized to the maximum extent possible while the incomplete execution of the set number of maximum partial lift injections during the period suitable for the fuel injection is inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of a fuel injection system for an internal combustion engine will be described with reference to FIGS. 1 to 5.

Figure 1:
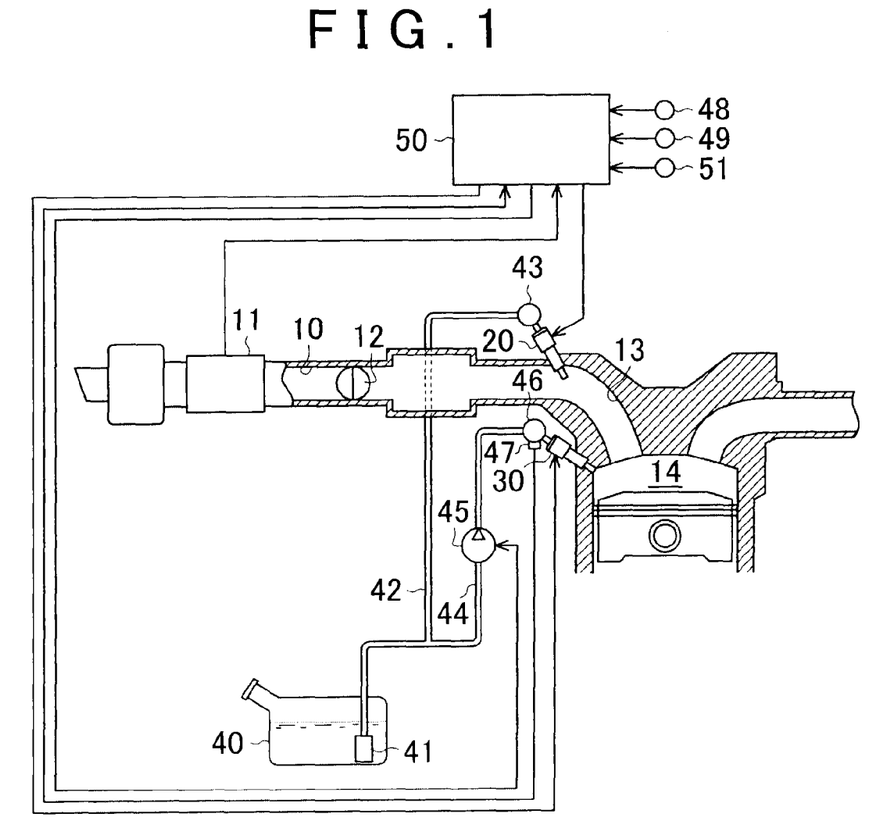
FIG. 1 is a schematic diagram illustrating the configuration of a first embodiment of a fuel injection system for an internal combustion engine.

As illustrated in FIG. 1, an air flow meter 11 that detects an intake air amount, which is the mass flow rate of intake air, and a throttle valve 12 that adjusts the intake air amount are arranged, in order from an upstream side, in an intake passage 10 of an internal combustion engine. The intake passage 10 branches on a further downstream side than the part where the throttle valve 12 is arranged and is connected to combustion chambers 14 for respective cylinders via intake ports 13.

Port injectors 20 for fuel injection into the intake ports 13 are arranged in the respective intake ports 13 for the respective cylinders. In-cylinder injectors 30 for fuel injection into the cylinders are arranged in the respective cylinders.

A feed pump 41 that pumps a fuel is arranged in a fuel tank 40 of the fuel injection system. The feed pump 41 is connected to a low-pressure fuel pipe 43 via a low-pressure fuel passage 42. The fuel pumped by the feed pump 41 is stored in the low-pressure fuel pipe 43. The port injectors 20 for the respective cylinders are connected to the low-pressure fuel pipe 43.

A high-pressure fuel passage 44 branches from the middle of the low-pressure fuel passage 42. A high-pressure fuel pump 45, which further pressurizes and discharges the fuel pumped by the feed pump 41, is arranged in the high-pressure fuel passage 44. The high-pressure fuel passage 44 is connected to a high-pressure fuel pipe 46 where the fuel pressurized by the high-pressure fuel pump 45 is stored. The in-cylinder injectors 30 for the respective cylinders are connected to the high-pressure fuel pipe 46.

A pressure sensor 47 is arranged in the high-pressure fuel pipe 46. The pressure sensor 47 detects the pressure of the fuel in the high-pressure fuel pipe 46, that is, a fuel pressure fp which is the pressure of the fuel supplied to the in-cylinder injectors 30.

An electronic control unit 50 is an unit that comprehensively controls the internal combustion engine and functions as an electronic control unit 50 that controls the fuel injection system. Detection signals from sensors are input into the electronic control unit 50. The sensors include not only the air flow meter 11 and the pressure sensor 47 but also, for example, a crank position sensor 48 that outputs a crank angle signal for the calculation of an engine rotation speed NE, which is the rotation speed of a crankshaft, a water temperature sensor 49 that detects the temperature of a coolant for the internal combustion engine, and an accelerator position sensor 51 that detects an accelerator operation amount. The electronic control unit 50 performs various types of control by driving the port injectors 20, the in-cylinder injectors 30, the high-pressure fuel pump 45, and the like based on the results of the detection by the sensors.

For example, the electronic control unit 50 performs fuel injection control and injection pressure control for in-cylinder injection. The injection pressure control for the in-cylinder injection is performed by feedback-adjusting the fuel discharge amount of the high-pressure fuel pump 45 based on the fuel pressure fp detected by the pressure sensor 47 so that the fuel pressure fp of the fuel supplied to the in-cylinder injectors 30 becomes equal to a target fuel pressure set based on the current engine operation state.

A required injection amount Qtotal, which is a target injection amount, is calculated during the fuel injection control. Then, the electronic control unit 50 controls the energization of the port injectors 20 and the in-cylinder injectors 30 so that the amount of the injected fuel is equal to the required injection amount Qtotal.

Figure 2:
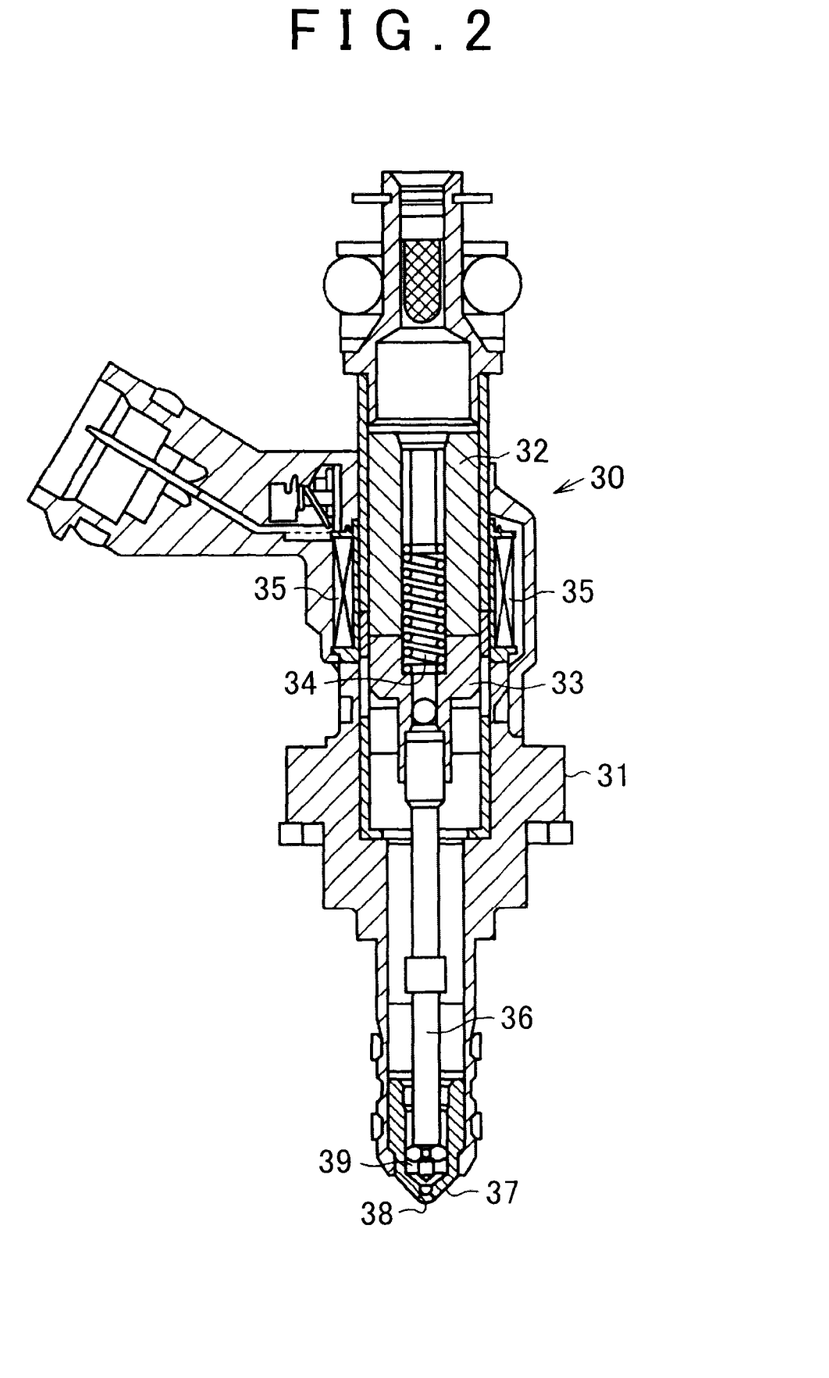
FIG. 2 is a sectional view of an in-cylinder injector of the first embodiment.

Next, the configuration of the in-cylinder injector 30 will be described in detail with reference to FIG. 2. As illustrated in FIG. 2, a fixed core 32 is fixed in a housing 31 of the in-cylinder injector 30. A movable core 33 is accommodated, to be slidable in the vertical direction of FIG. 2, at a position in the housing 31 that is adjacent to the fixed core 32. A needle valve 36 is connected to the movable core 33. The needle valve 36 is displaced in the vertical direction of FIG. 2 in response to a displacement of the movable core 33.

As illustrated in the lower section of FIG. 2, a nozzle body 37 that surrounds a tip portion of the needle valve 36 is attached to a tip portion of the housing 31. An elongated slit-shaped injection hole 38 is formed in a tip portion of the nozzle body 37.

As illustrated in the lower section of FIG. 2, a space 39 is formed between the needle valve 36 and the nozzle body 37. The space 39 communicates with the high-pressure fuel pipe 46. The high-pressure fuel in the high-pressure fuel pipe 46 is supplied into the space 39. A spring 34 causes the movable core 33 to remain biased toward the lower section of FIG. 2, that is, in a direction away from the fixed core 32.

A coil 35 is arranged at an outer circumferential part of the fixed core 32 in the housing 31. Accordingly, the energization of the coil 35 causes the fixed core 32 to be magnetized in the in-cylinder injector 30 and the movable core 33 to be pulled to the fixed core 32 against the biasing force of the spring 34. Then, the needle valve 36 is separated from the injection hole 38 to be opened and the fuel is injected through the injection hole 38. As illustrated in FIG. 2, the needle valve 36 is in a fully-open state when the movable core 33 abuts against the fixed core 32.

When the coil 35 is not energized, the movable core 33 is separated from the fixed core 32 due to the biasing force of the spring 34. As a result, the needle valve 36 abuts against the nozzle body 37 and is closed with the injection hole 38 blocked. In other words, the needle valve 36 is in a fully-closed state when the tip of the needle valve 36 abuts against the nozzle body 37 and the injection hole 38 is blocked. When the needle valve 36 blocks the injection hole 38 and is in the fully-closed state as described above, the injection of the fuel from the in-cylinder injector 30 is stopped.

Figure 3A:
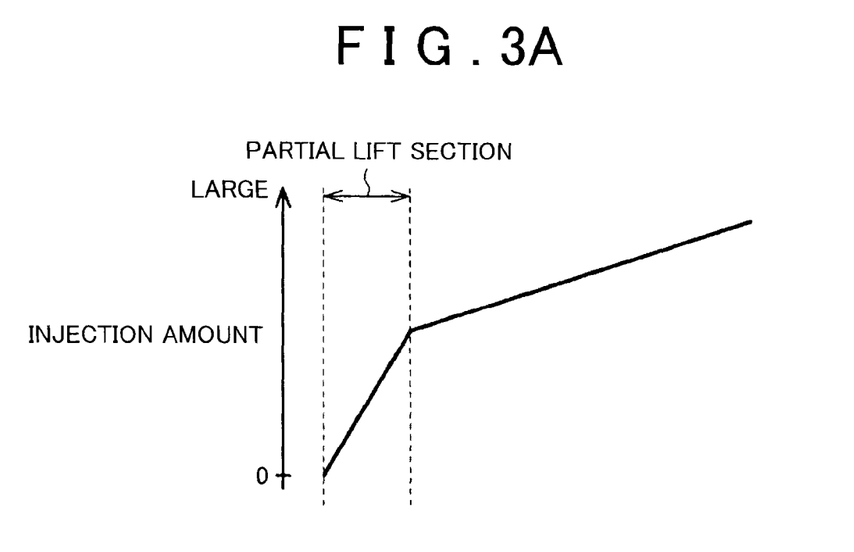
FIG. 3A is a graph illustrating a relationship of a change in injection amount to a change in energizing time regarding the in-cylinder injector of the first embodiment.

Regarding the in-cylinder injector 30, the injection amount increases as the length of the energizing time increases as illustrated in FIG. 3A and the rate of change in the injection amount with respect to a change in the energizing time is particularly high between the initiation of the energization and the moment when the needle valve 36 reaches the fully-open state (from the 0 to the Tmax in FIG. 3). This is because the lift amount of the needle valve 36 increases with the passage of the energizing time until the needle valve 36 is fully opened after the initiation of the energization. The rate of change in the injection amount with respect to the change in the energizing time becomes gradual once the energizing time exceeds the Tmax and the needle valve 36 is held in the fully-open state.

Figure 3B:
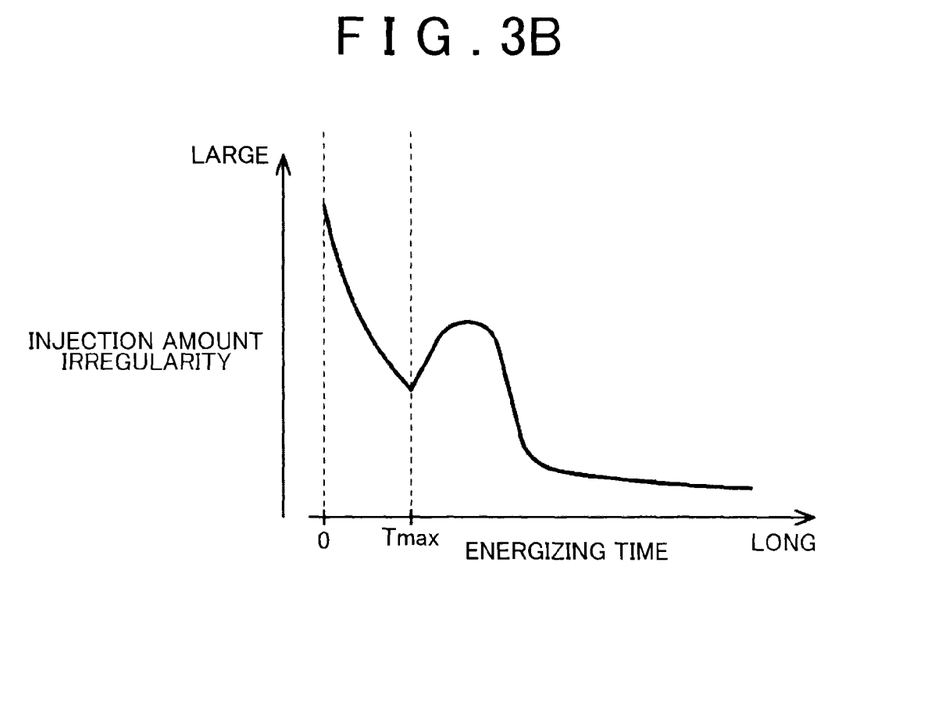
FIG. 3B is a graph illustrating a relationship of a change in injection amount irregularity to a change in energizing time regarding the in-cylinder injector of the first embodiment.

As illustrated in FIG. 3B, the irregularity of the injection amount increases as the energizing time decreases and the injection amount decreases. In addition, the injection amount irregularity increases immediately after the energizing time reaches the Tmax. This is because the movable core 33 and the fixed core 32 abut against each other when the needle valve 36 is fully open, the collision between the movable core 33 and the fixed core 32 causes a bounce operation in the needle valve 36, and the bounce operation causes the lift amount of the needle valve 36 to pulsate.

In order to improve exhaust properties, it is desirable to allow micro injection by decreasing the minimum injection amount per injection and realize a precise fuel injection control. However, the injection amount irregularity that is attributable to the bounce operation which is caused when the needle valve 36 of the in-cylinder injector 30 is fully open is likely to arise when the energizing time for the in-cylinder injector 30 is shortened so as to decrease the injection amount per injection.

In contrast, the micro injection can be realized without causing the bounce operation when partial lift injection, during which the needle valve 36 does not reach the fully-open state, is executed. In the partial lift injection, during which the energization is terminated before the needle valve 36 reaches the fully-open state, the injection amount irregularity tends to increase as the energizing time decreases as illustrated in FIG. 3B. Accordingly, the injection amount irregularity decreases, even during the partial lift injection, as the energizing time increases. Accordingly, the high-accuracy micro injection can be realized with the injection amount irregularity inhibited to the minimum when maximum partial lift injection, in which the energizing time is the longest in the partial lift injection, is executed. The maximum partial lift injection, in which the energizing time is the longest in the partial lift injection, is executed in this fuel injection system. The energizing time for the execution of the maximum partial lift is set based on the indexing of the energizing time for the least injection amount irregularity in the partial lift injection, which is based on the result of a previously-performed experiment or the like, and the indexed energizing time.

Next, a series of processing relating to the setting of the number of executions n of the maximum partial lift injection for a single injection stroke for the injection of the fuel used in combustion in a single combustion stroke will be described with reference to FIG. 4. This series of processing is repeatedly executed by the electronic control unit 50 as part of the fuel injection control while the engine is in operation.

Figure 4:
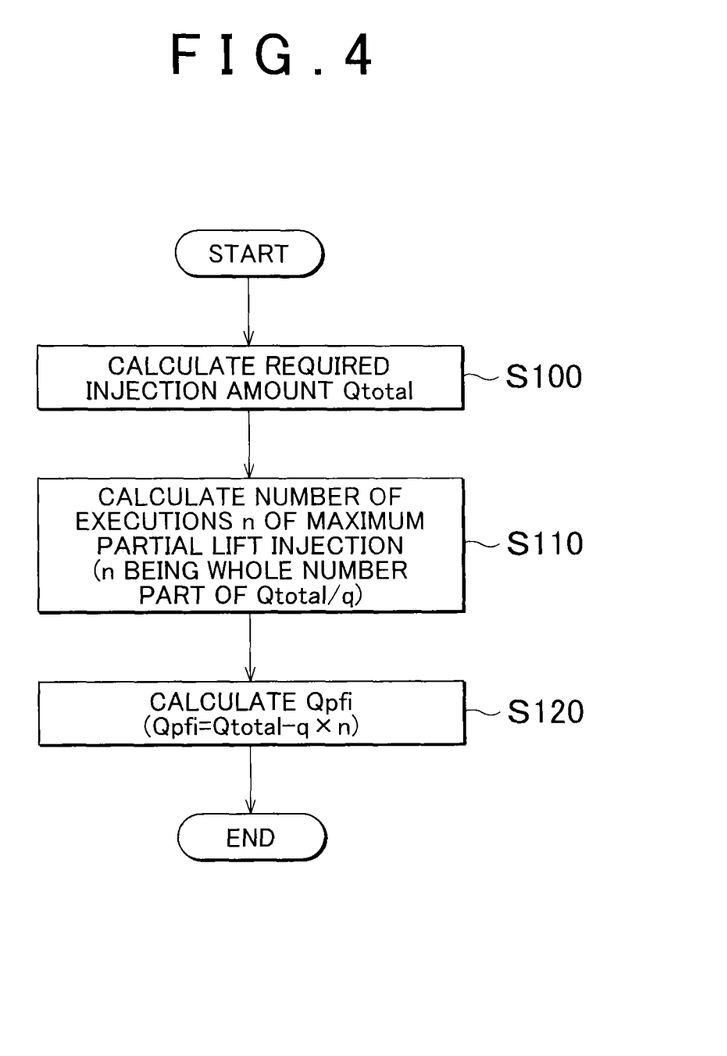
FIG. 4 is a flowchart illustrating the flow of a series of processing performed when the number of executions of maximum partial lift injection is set by a control device of the first embodiment.

When this processing is initiated, the electronic control unit 50 first calculates the required injection amount Qtotal in Step S100 as illustrated in FIG. 4. The required injection amount Qtotal is a target value for the injection amount of a single injection stroke. For example, the required injection amount Qtotal is calculated based on an air filling rate Rair so that the required injection amount Qtotal increases as the air filling rate Rair increases.

The air filling rate Rair has a value corresponding to the quotient that is obtained by dividing an air filling amount, which is the mass of the air present in the combustion chamber 14 when an intake valve of the internal combustion engine is closed, by a maximum air filling amount depending on a cylinder bore diameter and a piston stroke length. The air filling rate Rair is calculated based on the intake air amount detected by the air flow meter 11. More specifically, the amount of intake air received by an intake manifold and the amount of intake air sent from the intake manifold to the combustion chamber 14 are calculated by using intake manifold model calculation and the air filling rate Rair is calculated from the relationship between the intake air amounts.

The processing proceeds to Step S110 after the calculation of the required injection amount Qtotal through Step S100. In Step S110, the control device 50 calculates the number of executions of the maximum partial lift injection per injection stroke. Herein, the value that is equal to the whole number part of the quotient which is obtained by dividing the required injection amount Qtotal by the injection amount q per maximum partial lift injection is calculated as the number of executions n. Accordingly, the number of executions n is "0" in a case where, for example, the quotient that is obtained by dividing the required injection amount Qtotal by the injection amount q per maximum partial lift injection has a value exceeded by "1".

The relationship between the energizing time and the injection amount that is illustrated in FIG. 3A shows that the injection amount q per maximum partial lift injection depends on the energizing time for the maximum partial lift injection. However, the injection amount q is changed by the fuel pressure fp, which is the pressure of the fuel supplied to the in-cylinder injector 30, even when the energizing time for the maximum partial lift injection is set in advance. Accordingly, the injection amount q is calculated with reference to the fuel pressure fp and the number of executions n is calculated by using the calculated injection amount q herein.

The processing proceeds to Step S120 after the calculation of the number of executions n through Step S110. In Step S120, the control device 50 calculates a port injection amount Qpfi that is the amount of injection by the port injector 20. The difference that is obtained by subtracting an in-cylinder injection amount Qdi, which is the sum of the injection amounts of the maximum partial lift injection per injection stroke, from the required injection amount Qtotal is calculated as the port injection amount Qpfi. In other words, the difference that is obtained by subtracting the product of the injection amount q and the number of executions n from the required injection amount Qtotal is calculated as the port injection amount Qpfi. Accordingly, the value that is equal to the required injection amount Qtotal is calculated as the port injection amount Qpfi in a case where the number of executions of the maximum partial lift injection is "zero".

This series of processing is temporarily terminated by the control device 50 when the port injection amount Qpfi is calculated through Step S120 as described above. Then, n times of the maximum partial lift injection by the in-cylinder injector 30 based on the calculated number of executions n and the fuel injection by the port injector 20 based on the calculated port injection amount Qpfi are executed for the cylinder subjected to the injection stroke.

Figure 5:
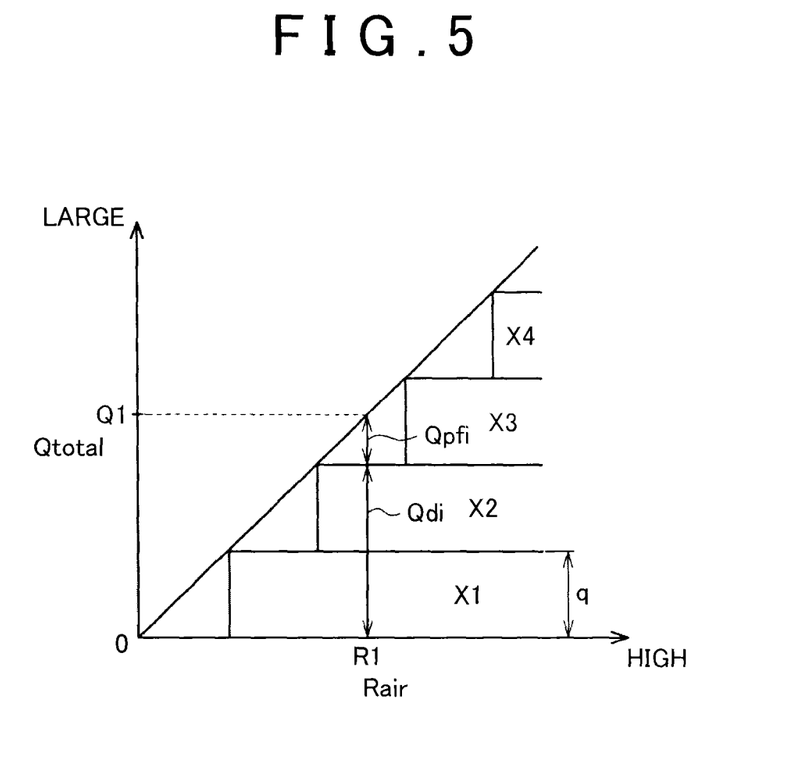
FIG. 5 is a graph illustrating a relationship between an air filling rate and a required injection amount regarding the fuel injection system of the first embodiment and a relationship between the number of executions of the maximum partial lift injection and a port injection amount with respect to the required injection amount.

Next, an effect of the fuel injection control according to this first embodiment will be described with reference to FIG. 5. In FIG. 5, "X1" represents the injection amount of the first maximum partial lift injection, "X2" represents the injection amount of the second maximum partial lift injection, "X3" represents the injection amount of the third maximum partial lift injection, and "X4" represents the injection amount of the fourth maximum partial lift injection. Each of the X1 to the X4 is equal to the injection amount q per maximum partial lift injection described above.

As illustrated in FIG. 5, the required injection amount Qtotal increases as the air filling rate Rair increases. Since the value that is equal to the whole number part of the quotient which is obtained by dividing the required injection amount Qtotal by the injection amount q is calculated as the number of executions n of the maximum partial lift injection, the maximum number among the numbers of injections at which the in-cylinder injection amount Qdi, which is the sum of the injection amounts of the maximum partial lift injection, becomes equal to or less than the required injection amount Qtotal becomes the number of executions n. The shortfall compared to the required injection amount Qtotal that is caused with the maximum partial lift injection by the in-cylinder injector 30 alone becomes the port injection amount Qpfi, and this amount of the fuel is injected from the port injector 20.

Accordingly, as illustrated in FIG. 5, the required injection amount Qtotal becomes "Q1" when the air filling rate Rair is "R1" during the combustion injection control in the fuel injection system of the first embodiment. In this case, the maximum partial lift injection is executed twice in the injection stroke, and the port injector 20 injects the fuel by the amount equal to the shortfall compared to the required injection amount Qtotal that is caused when the maximum partial lift injection is performed only twice.

The following effects are achieved by the first embodiment described above. (1) In the injection stroke, the maximum partial lift injection is executed within a range of number not exceeding the required injection amount Qtotal, and thus the fuel injection control can be performed by using the high-accuracy maximum partial lift injection even during the partial lift injection. Accordingly, the precise fuel injection control using the partial lift injection can be realized.

(2) The number of executions n of the maximum partial lift injection increases as the required injection amount Qtotal increases. Accordingly, the chance of execution of the high-accuracy maximum partial lift injection increases, and the precise fuel injection can be realized.

(3) In a case where the injection amount falls short of the required injection amount Qtotal with the maximum partial lift injection alone, the port injector 20 injects the fuel corresponding to the shortfall. Accordingly, the fuel commensurate with the required injection amount Qtotal can be supplied.

(4) The maximum partial lift injection is executed to the maximum extent within a range in which the in-cylinder injection amount Qdi, which is the sum of the injection amounts of the maximum partial lift injection, does not exceed the required injection amount Qtotal. Accordingly, the fuel injection control can be performed, even during the partial lift injection, with the high-accuracy maximum partial lift injection utilized to the maximum extent possible.

The first embodiment described above can be implemented in appropriately modified forms as follows. The method for calculating the number of executions n may be changed insofar as the number of executions n can be calculated so that the maximum number among the numbers of injections at which the in-cylinder injection amount Qdi, which is the sum of the amounts of the injection from the in-cylinder injectors 30 per injection stroke, becomes equal to or less than the required injection amount Qtotal becomes the number of executions n of the maximum partial lift injection. For example, the number of executions n may be calculated with respect to a two-dimensional map that uses the fuel pressure fp and the required injection amount Qtotal as variables.

Next, a second embodiment of the fuel injection system for an internal combustion engine will be described with reference to FIGS. 6 and 7. The second embodiment is a modification of the details of the processing according to the first embodiment described with reference to FIG. 4. Accordingly, the same reference numerals will be used to refer to the parts common to the first and second embodiments with detailed description thereof omitted, and the following description will focus on the details of a series of processing relating to the setting of the number of executions n of the maximum partial lift injection which are different from those of the first embodiment.

Figure 6:
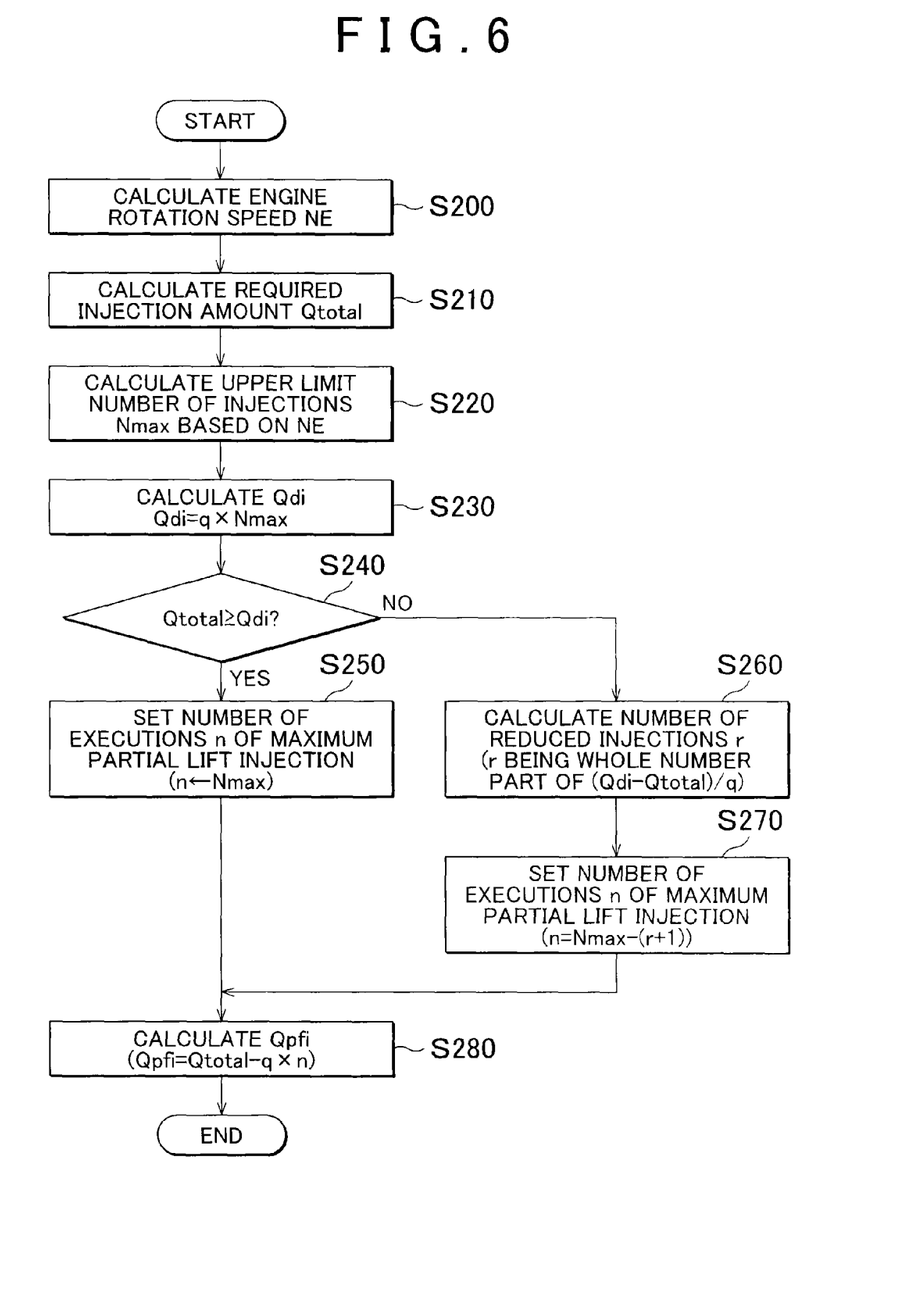
FIG. 6 is a flowchart illustrating the flow of a series of processing performed when the number of executions of maximum partial lift injection is set by a control device of a fuel injection system of a second embodiment.

In the fuel injection system according to the second embodiment, the series of processing that is illustrated in FIG. 6 is executed instead of the series of processing described with reference to FIG. 4. This series of processing is repeatedly executed by the control device 50 as part of the fuel injection control while the engine is in operation.

When this processing is initiated, the electronic control unit 50 first calculates the engine rotation speed NE in Step S200 as illustrated in FIG. 6. The engine rotation speed NE is calculated based on the crank angle signal output from the crank position sensor 48.

The processing proceeds to Step S210 after the calculation of the engine rotation speed NE through Step S200. In Step S210, the electronic control unit 50 calculates the required injection amount Qtotal that is a target value for the injection amount per injection stroke. For example, the required injection amount Qtotal is calculated based on the air filling rate Rair, as in the processing of Step S100 according to the first embodiment, so that the required injection amount Qtotal increases as the air filling rate Rair increases.

The processing proceeds to Step S220 after the calculation of the required injection amount Qtotal through Step S210. In Step S220, the electronic control unit 50 calculates an upper limit number of injections Nmax based on the engine rotation speed NE. The upper limit number of injections Nmax is the upper limit value of the number of maximum partial lift injections executed during a single injection stroke. The period suitable for the fuel injection shortens as the engine rotation speed NE increases. Accordingly, herein, the length of the period suitable for the fuel injection is estimated based on the engine rotation speed NE and the value of the number of the maximum partial lift injections that can be executed during the estimated period is calculated based on the energizing time for a single maximum partial lift injection and the interval which is required between the respective maximum partial lift injections. Then, the calculated value becomes the upper limit number of injections Nmax. In this manner, the maximum number within the range of the number of the executions allowed during the period suitable for the fuel injection is calculated as the upper limit number of injections Nmax in Step S220.

The processing proceeds to Step S230 after the calculation of the upper limit number of injections Nmax through Step S220. In Step S230, the electronic control unit 50 calculates the in-cylinder injection amount Qdi that is the sum of the injection amounts of the maximum partial lift injection. Herein, the injection amount q per maximum partial lift injection is multiplied by the upper limit number of injections Nmax, and the product is calculated as the in-cylinder injection amount Qdi. As in Step S110 according to the first embodiment, the injection amount q is calculated with reference to the fuel pressure fp.

The processing proceeds to Step S240 after the calculation of the in-cylinder injection amount Qdi through Step S230. In Step S240, the electronic control unit 50 determines whether or not the in-cylinder injection amount Qdi is equal to or less than the required injection amount Qtotal. In other words, herein, it is determined whether or not the injection amount of the maximum partial lift injection is equal to or less than the required injection amount Qtotal.

The processing proceeds to Step S250 in a case where it is determined in Step S240 that the in-cylinder injection amount Qdi is equal to or less than the required injection amount Qtotal (Step S240: YES).

In Step S250, the electronic control unit 50 sets the number of executions n of the maximum partial lift injection. Herein, the number of executions n is equal in value to the upper limit number of injections Nmax. In other words, the number of executions n is set through Step S250 to the number equal to the upper limit number of injections Nmax.

The processing proceeds to Step S280 after the setting of the number of executions n through Step S250. The processing proceeds to Step S260 in a case where it is determined in Step S240 that the in-cylinder injection amount Qdi exceeds the required injection amount Qtotal (Step S240: NO).

In Step S260, the electronic control unit 50 calculates the number of reduced injections r. Herein, the value that is equal to the whole number part of the quotient which is obtained by dividing the difference obtained by subtracting the required injection amount Qtotal from the in-cylinder injection amount Qdi by the injection amount q is calculated as the number of reduced injections r. Accordingly, the number of reduced injections r becomes "zero" in a case where, for example, the quotient which is obtained by dividing the difference obtained by subtracting the required injection amount Qtotal from the in-cylinder injection amount Qdi by the injection amount q has a value exceeded by "1".

The processing proceeds to Step S270 after the calculation of the number of reduced injections r through Step S260. In Step S270, the electronic control unit 50 sets the number of executions n of the maximum partial lift injection. Herein, the difference that is obtained by subtracting the sum which is obtained by adding "1" to the number of reduced injections r from the upper limit number of injections Nmax is calculated as the number of executions n. Accordingly, the number of executions n is set to the number smaller by one than the upper limit number of injections Nmax when the number of reduced injections r is "0".

The processing proceeds to Step S280 after the setting of the number of executions n through Step S270. In Step S280, the electronic control unit 50 calculates the port injection amount Qpfi that is the amount of injection by the port injector 20. Herein, the difference that is obtained by subtracting the product of the injection amount q and the number of executions n from the required injection amount Qtotal is calculated as the port injection amount Qpfi as in Step S120 according to the first embodiment.

This series of processing is temporarily terminated by the control device 50 when the port injection amount Qpfi is calculated through Step S280 as described above. Then, n times of the maximum partial lift injection by the in-cylinder injector 30 based on the calculated number of executions n and the fuel injection by the port injector 20 based on the calculated port injection amount Qpfi are executed for the cylinder subjected to the injection stroke.

Next, an effect of the fuel injection control according to this second embodiment will be described with reference to FIG. 7. In FIG. 7, "X1" represents the injection amount of the first maximum partial lift injection, "X2" represents the injection amount of the second maximum partial lift injection, "X3" represents the injection amount of the third maximum partial lift injection, and "X4" represents the injection amount of the fourth maximum partial lift injection. Each of the X1 to the X4 is equal to the injection amount q per maximum partial lift injection described above.

In the fuel injection system according to the second embodiment, the required injection amount Qtotal increases as the air filling rate Rair increases as in the first embodiment. In the fuel injection system according to the second embodiment, however, the upper limit number of injections Nmax is calculated and the number of executions n is set in accordance with the upper limit number of injections Nmax unlike in the first embodiment in which the maximum number among the numbers of injections at which the in-cylinder injection amount Qdi becomes equal to or less than the required injection amount Qtotal is used the number of executions n as it is. Accordingly, a difference may arise in the number of executions n of the maximum partial lift injection due to the upper limit number of injections Nmax even in the case of the same required injection amount Qtotal.

Figure 7:
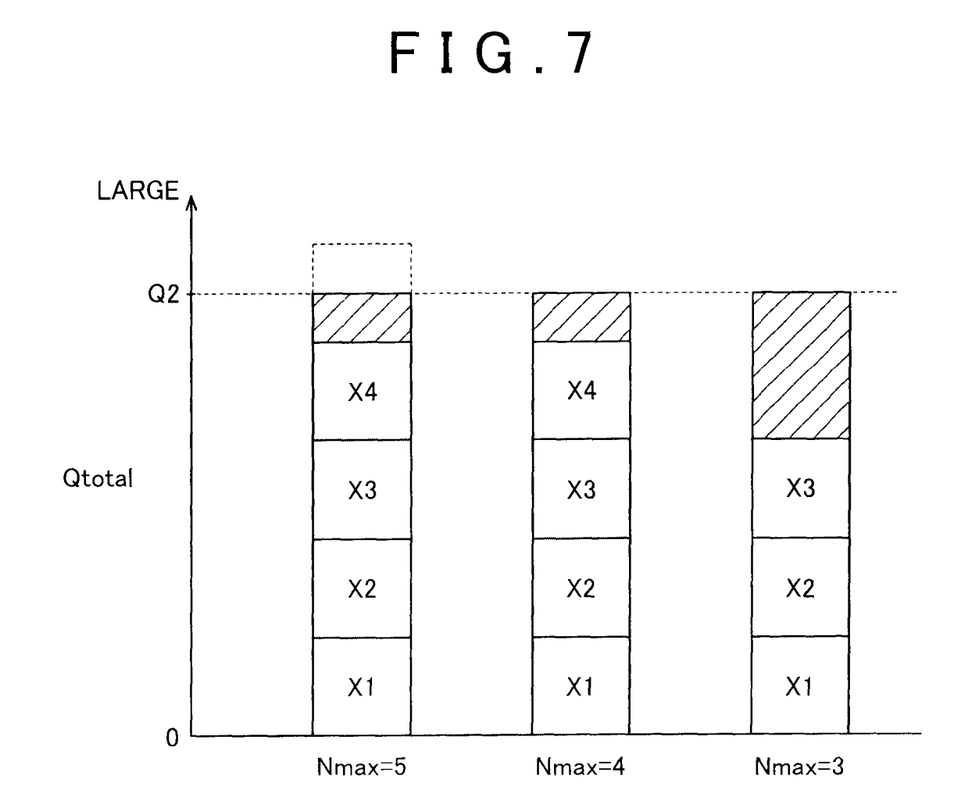
FIG. 7 is a graph illustrating a relationship between the number of executions of the maximum partial lift injection and an upper limit number of injections regarding the fuel injection system of the second embodiment.

For example, the manner of the setting of the number of executions n may vary in cases where the upper limit number of injections Nmax is five times, four times, and three times as illustrated in FIG. 7 even in a case where the required injection amount Qtotal is fixed at "Q2".

As illustrated on the left side of FIG. 7, the in-cylinder injection amount Qdi that is calculated through Step S230 of the series of processing described with reference to FIG. 6 exceeds "Q2", which is the required injection amount Qtotal, as illustrated by the dashed line in a case where the upper limit number of injections Nmax is five times or more. Accordingly, in this case, a negative determination is made in Step S240 (Step S240: NO). In this case, the difference between the in-cylinder injection amount Qdi and the required injection amount Qtotal is exceeded by the injection amount q, and thus the number of reduced injections r that is calculated through Step S260 becomes "zero". Then, the number of executions n becomes "4", which is the difference that is obtained by subtracting "1" from "5" as the upper limit number of injections Nmax, through Step S270. In a case where the required injection amount Qtotal is "Q2" and the upper limit number of injections Nmax is five times as described above, the number of executions n of the maximum partial lift injection becomes four times as illustrated on the left side of FIG. 7 and the shortfall compared to the required injection amount Qtotal becomes the port injection amount Qpfi as illustrated by the oblique line.

In a case where the in-cylinder injection amount Qdi of the five times of the maximum partial lift injection exceeds the required injection amount Qtotal even when the upper limit number of injections Nmax is five times as described above, the number of executions n is set to four times, which is the maximum within the range in which the in-cylinder injection amount Qdi does not exceed the required injection amount Qtotal.

In a case where the upper limit number of injections Nmax is four times as illustrated at the center of FIG. 7, the in-cylinder injection amount Qdi calculated through Step S230 of the series of processing described with reference to FIG. 6 becomes equal to or less than "Q2" that is the required injection amount Qtotal. Accordingly, in this case, a positive determination is made in Step S240 (Step S240: YES). Accordingly, in this case, the number of executions n becomes "4", which is equal to the upper limit number of injections Nmax, through Step S250. In a case where the required injection amount Qtotal is "Q2" and the upper limit number of injections Nmax is four times as described above, the number of executions n of the maximum partial lift injection becomes four times as illustrated at the center of FIG. 7 and the shortfall compared to the required injection amount Qtotal becomes the port injection amount Qpfi as illustrated by the oblique line.

In a case where the upper limit number of injections Nmax is three times as illustrated on the right side of FIG. 7, the in-cylinder injection amount Qdi calculated through Step S230 of the series of processing described with reference to FIG. 6 also becomes equal to or less than "Q2" that is the required injection amount Qtotal. Accordingly, in this case, a positive determination is made in Step S240 (Step S240: YES), and the number of executions n becomes "3", which is equal to the upper limit number of injections Nmax, through Step S250. In a case where the required injection amount Qtotal is "Q2" and the upper limit number of injections Nmax is three times as described above, the number of executions n of the maximum partial lift injection becomes three times as illustrated on the right side of FIG. 7 and the shortfall compared to the required injection amount Qtotal becomes the port injection amount Qpfi as illustrated by the oblique line.

In a case where the in-cylinder injection amount Qdi of the same number of maximum partial lift injections as the upper limit number of injections Nmax is equal to or less than the required injection amount Qtotal as described above, the number of executions n becomes equal in value to the upper limit number of injections Nmax.

As described above, according to the fuel injection system of the second embodiment, the maximum number among the numbers of injections at which the in-cylinder injection amount Qdi, which is the injection amount of the maximum partial lift injection, becomes equal to or less than the required injection amount Qtotal that is within the range of the number of the maximum partial lift injections that can be executed during a single injection stroke becomes the number of executions n of the maximum partial lift injection. Then, the shortfall compared to the required injection amount Qtotal that is caused with the maximum partial lift injection by the in-cylinder injector 30 alone becomes the port injection amount Qpfi, and this amount of the fuel is injected from the port injector 20.

The following effect described in (4) is achieved, along with effects similar to the (1) and (2) of the first embodiment, by the second embodiment described above. (4) The maximum partial lift injection is executed to the maximum extent possible within the range of the number of the executions allowed in a single injection stroke with the in-cylinder injection amount Qdi, which is the sum of the injection amounts of the maximum partial lift injection in a single injection stroke, not exceeding the required injection amount Qtotal. Accordingly, the fuel injection control can be performed with the high-accuracy maximum partial lift injection utilized to the maximum extent possible while the incomplete execution of the set number of maximum partial lift injections during the period suitable for the fuel injection can be inhibited.

The second embodiment described above can be implemented in appropriately modified forms as follows. Although a method for estimating the length of the period suitable for the fuel injection based on the engine rotation speed NE and calculating the value of the number of maximum partial lift injections that can be executed during the estimated period has been described as an example of the second embodiment, the method for calculating the upper limit number of injections Nmax can be changed. For example, the upper limit number of injections Nmax may be calculated by using a calculation map using the engine rotation speed NE as a variable.

The method for setting the number of executions n may be changed insofar as the maximum number among the numbers of injections at which the in-cylinder injection amount Qdi of the maximum partial lift injection becomes equal to or less than the required injection amount Qtotal that is within the range of the number of the maximum partial lift injections that can be executed during a single injection stroke becomes the number of executions n. For example, the number of actual executions may be limited by using an upper limit value after the setting of the upper limit value based on the engine rotation speed NE and the calculation of the number of executions n of the maximum partial lift injection. More specifically, the number of executions n is updated to the value equal to the upper limit value in a case where the calculated number of executions n exceeds the upper limit value. Then, the injection amount Qpfi of the port injector 20 is calculated based on the number of executions n updated to the value equal to the upper limit value and the fuel injection control is executed based on the updated number of executions n and the injection amount Qpfi. Even in this case, the maximum partial lift injection can be executed to the maximum extent possible within the range of the number of the possible executions.

Although an example in which the upper limit number of injections Nmax is the maximum number within the range of the number of the executions allowed during the period suitable for the fuel injection has been described in the second embodiment described above, the upper limit number of injections Nmax is not limited to a number within the range of the number of the executions allowed during the period suitable for the fuel injection or the maximum number. For example, the number of executions n may be limited up to twice with the upper limit number of injections Nmax being "2" when the number of the possible executions is three times.

In other words, the method for setting the number of executions n may be changed insofar as the number of executions n can be set among the numbers of injections at which the in-cylinder injection amount Qdi of the maximum partial lift injection becomes equal to or less than the required injection amount Qtotal and within the range of the number of the maximum partial lift injections that can be executed during a single injection stroke.

When the upper limit number of injections Nmax is a number within the range of the number of the executions allowed during the period suitable for the fuel injection, the high-accuracy fuel injection control can be performed while the incomplete execution of the set number of maximum partial lift injections during the period suitable for the fuel injection is inhibited.

However, it is desirable to apply the configuration in which the maximum number among the numbers of injections satisfying a condition that is within the range of the number of the possible executions is set as the number of executions n as in the second embodiment in maximizing the number of executions n of the high-accuracy maximum partial lift injection, utilizing the high-accuracy maximum partial lift injection to the maximum extent possible, and realizing the precise fuel injection control.

When a configuration in which the number of executions n of the maximum partial lift injection by the in-cylinder injector 30 is allowed to be smaller when the engine rotation speed is high rather than when the engine rotation speed is low is adopted, the incomplete execution of the set number of executions n of the maximum partial lift injection during the period suitable for the fuel injection can be inhibited.

In other words, the incomplete execution of the set number of executions n of the maximum partial lift injection during the period suitable for the fuel injection can be inhibited even when the processing for calculating the number of injections that can be executed which is based on the engine rotation speed NE is not executed.

For example, a configuration in which the manner of the setting of the number of executions n is changed in accordance with whether or not the engine rotation speed NE is equal to or higher than a threshold and the number of executions n is set so that the number of executions n is allowed to be smaller when the engine rotation speed NE is equal to or higher than the threshold than when the engine rotation speed NE is exceeded by the threshold can also be adopted. In a case where this configuration is adopted, for example, the magnitude of the threshold may be set for the number of executions n to be set to any one of zero to three times within the range of the engine rotation speed NE in which the number of the injections that can be executed is at least three times. Even with this configuration, the incomplete execution of the set number of executions n of the maximum partial lift injection during the period suitable for the fuel injection can be inhibited.

A situation in which the set number of maximum partial lift injections are not completely executed may arise, even with the configuration of the first embodiment, in a case where the energization period that is required for the maximum partial lift injection of the in-cylinder injector 30 is extremely short and in a case where the interval that is required between the respective maximum partial lift injections is extremely short. In addition, the situation in which the set number of maximum partial lift injections are not completely executed may also arise in a case where, for example, the maximum partial lift injection is executed only under a condition in which the engine rotation speed NE is not changed to a large extent. Accordingly, in some cases, no inconvenience arises even when the configuration of the first embodiment is adopted without the configuration for setting the upper limit number of injections Nmax as in the second embodiment being adopted.

Modifiable elements that are common to both of the embodiments described above are as follows. The fuel injection control using the maximum partial lift injection may be executed only in a case where a predetermined condition is satisfied. In this case, the processing for setting the number of executions n of the maximum partial lift injection may be executed as in each of the embodiments described above in a case where the predetermined condition is satisfied.

A method for calculating the required injection amount Qtotal is not limited to the method described in each of the embodiments described above and can be changed. For example, the required injection amount Qtotal may be calculated from the engine rotation speed NE and the accelerator operation amount. In addition, the required injection amount Qtotal may be calculated based on an engine load so that the required injection amount Qtotal increases as the engine load increases.

An example in which the number of executions n is set so that the maximum partial lift injection is executed to the maximum extent possible within the range of the number of injections that can be executed and within the range of the number of injections not exceeding the required injection amount Qtotal has been described in each of the embodiments described above. However, the number of executions n does not have to be set for the maximum partial lift injection to be executed to the maximum extent possible. The precise fuel injection control using the high-accuracy maximum partial lift injection can be realized, even during the partial lift injection, insofar as the number of executions n is set within the range in which the in-cylinder injection amount Qdi of the maximum partial lift injection does not exceed the required injection amount Qtotal.

Figure 8:
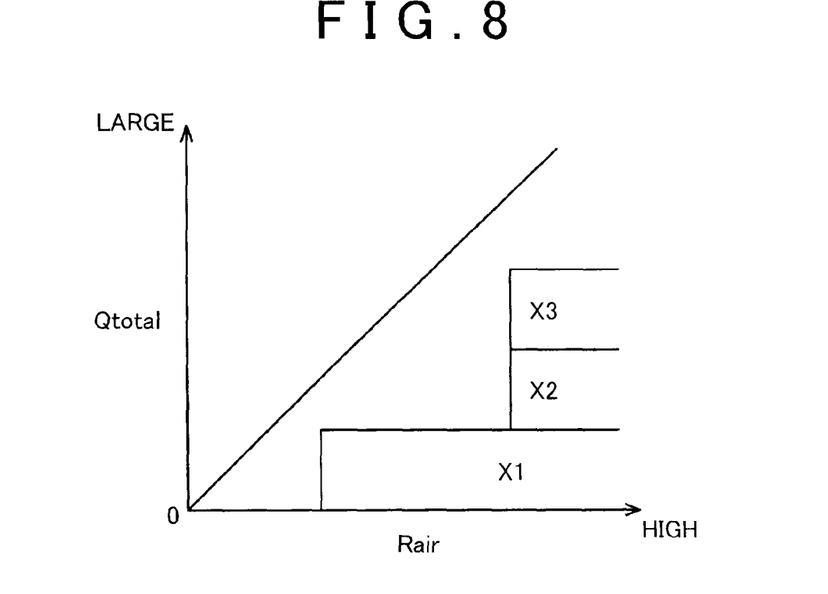
FIG. 8 is a graph illustrating a relationship between an air filling rate and a required injection amount regarding a fuel injection system as a modification example and a relationship between the number of executions of maximum partial lift injection and a port injection amount with respect to the required injection amount.

For example, a configuration in which the injection amount of the maximum partial lift injection with respect to the required injection amount Qtotal is smaller than in the case illustrated in FIG. 5 can be adopted as illustrated in FIG. 8. In addition, a configuration in which the number of executions n is increased by twice or more when the required injection amount Qtotal is equal to or greater than a predetermined amount can be adopted as illustrated in FIG. 8.

The number of executions n does not necessarily have to be set for the number of executions n to increase as the required injection amount Qtotal increases. For example, a configuration in which the number of executions n is set to three times when the required injection amount Qtotal is less than a first predetermined amount and the number of executions n is set to twice when the required injection amount Qtotal is equal to or greater than the first predetermined amount can be adopted. Even in a case where this configuration is adopted, the precise fuel injection control using the high-accuracy maximum partial lift injection can be realized, even during the partial lift injection, insofar as the in-cylinder injection amount Qdi is equal to or less than the required injection amount Qtotal.

Figure 9:
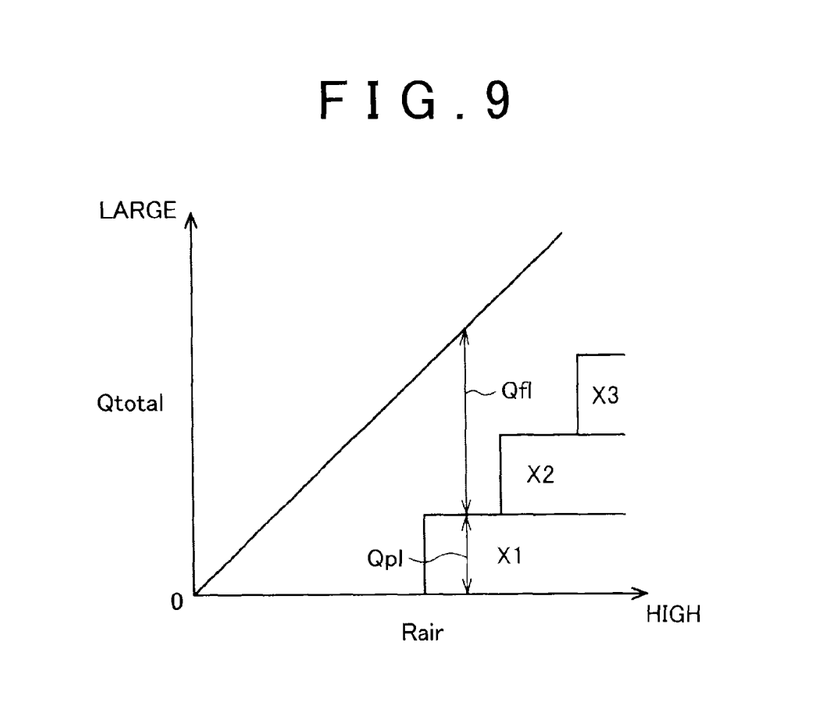
FIG. 9 is a graph illustrating a relationship between an air filling rate and a required injection amount regarding a fuel injection system as a modification example and a relationship between the number of executions of maximum partial lift injection and a full lift injection amount with respect to the required injection amount.

In a case where a configuration for setting a smaller number of executions n is adopted instead of the configuration for setting the number of executions n for the maximum partial lift injection to be executed to the maximum extent possible, a method for supplying the fuel by the amount of the shortfall by a method other than the method of each of the embodiments described above can be adopted in some cases. Specifically, a configuration in which full lift injection, which allows the needle valve 36 of the in-cylinder injector 30 to be fully opened, is executed in addition to the maximum partial lift injection and the full lift injection supplements the fuel corresponding to the shortfall compared to the required injection amount Qtotal with the maximum partial lift injection alone can be adopted. The injection amount of the full lift injection exceeds the injection amount of one maximum partial lift. Accordingly, the application of this configuration is limited to a case where a small number of executions n of the maximum partial lift injection is set and the amount of the fuel corresponding to the shortfall compared to the required injection amount Qtotal with the maximum partial lift injection alone increases as illustrated in FIG. 9. In a case where this configuration is adopted, the amount that is short of the required injection amount Qtotal with a partial lift injection amount Qpl, which is the sum of the injection amounts of the maximum partial lift injection, alone becomes a full lift injection amount Qfl as the injection amount of the full lift injection, and this amount of the fuel is injected by the full lift injection from the in-cylinder injector 30 as illustrated in FIG. 9. In this case, the sum of the partial lift injection amount Qpl and the full lift injection amount Qfl becomes the in-cylinder injection amount Qdi. In a case where this configuration is adopted, the fuel injection system may not be provided with the port injector 20.

The precise fuel injection control using the high-accuracy maximum partial lift injection can be realized, even during the partial lift injection, insofar as the number of executions n is set within the range in which the injection amount of the maximum partial lift injection does not exceed the required injection amount Qtotal as described above. However, it is desirable to apply the configuration in which the maximum number of injections among the numbers of injections satisfying a condition is set as the number of executions n as in each of the embodiments described above in maximizing the number of executions n of the high-accuracy maximum partial lift injection, utilizing the high-accuracy maximum partial lift injection to the maximum extent possible, and realizing the precise fuel injection control.

What is claimed is:

1. A control device for an internal combustion engine, the internal combustion engine including an in-cylinder injector, and the in-cylinder injector configured to inject a fuel into a cylinder of the internal combustion engine, the control device comprising:
an electronic control unit configured to:
control energizing time for the in-cylinder injector when a partial lift injection is performed such that the partial lift injection becomes maximum partial lift injection with a longest energizing time in the partial lift injection, the partial lift injection being an injection during which a needle valve of the in-cylinder injector does not reach a fully open state; and
control the number of energizations for performing the maximum partial lift injection during a single injection stroke such that a total of injection amounts of the maximum partial lift injection by the number of the energizations is equal to or less than a required injection amount as a target amount for an injection amount of a single injection stroke.

2. The control device according to claim 1, wherein the electronic control unit is configured to control the number of energizations for performing the maximum partial lift injection such that the number of energizations for performing the maximum partial lift injection increases as the required injection amount increases.

3. The control device according to claim 1, wherein
the electronic control unit is configured to execute full lift injection during which the needle valve of the in-cylinder injector is fully opened in addition to the maximum partial lift injection, and
the electronic control unit is configured to allow the fuel to be injected by the full lift injection from the in-cylinder injector by the amount equal to the amount short of the required injection amount with the maximum partial lift injection alone.

4. The control device according to claim 1, wherein
the internal combustion engine includes a port injector configured to inject a fuel into an intake port,
the electronic control unit is configured to control the energization of the port injector in addition to the energization of the in-cylinder injector, and
the electronic control unit is configured to allow the fuel to be injected from the port injector by the amount equal to the amount short of the required injection amount with the maximum partial lift injection alone.

5. The control device according to claim 4, wherein the electronic control unit is configured to control the number of energizations for performing the maximum partial lilt injection such that the number of energizations for performing the maximum partial lift injection is a maximum number among the numbers of the energization at which the injection amount of the maximum partial lift injection is equal to or less than the required injection amount.

6. The control device according to claim 4, wherein the electronic control unit is configured to control the number of energizations for performing the maximum partial lift injection such that the number of energizations for performing the maximum partial lift injection is a maximum number within the number of energizations which is performed by the in-cylinder injector during a single injection stroke.

\* \* \* \* \*